US007340274B2

(12) United States Patent
Harano

(10) Patent No.: US 7,340,274 B2
(45) Date of Patent: Mar. 4, 2008

(54) CELLULAR PHONE CAPABLE OF RECEIVING A PLURALITY OF BROADCAST WAVES

(75) Inventor: Nobuya Harano, Kakegawa (JP)

(73) Assignee: NEC Corporation, Tokyo (JP)

( * ) Notice: Subject to any disclaimer, the term of this patent is extended or adjusted under 35 U.S.C. 154(b) by 533 days.

(21) Appl. No.: 10/994,631

(22) Filed: Nov. 23, 2004

(65) Prior Publication Data

US 2005/0119026 A1 Jun. 2, 2005

(51) Int. Cl.
*H04M 7/20* (2006.01)
*H04M 1/38* (2006.01)

(52) U.S. Cl. .............................. 455/556.1; 455/550.1; 455/557

(58) Field of Classification Search ............ 455/556.1, 455/550.1, 557, 422.1, 90.1, 90.3, 575.1, 455/344, 82, 552.1, 553
See application file for complete search history.

(56) References Cited

U.S. PATENT DOCUMENTS

| | | | | |
|---|---|---|---|---|
| 5,089,829 | A | 2/1992 | Haruyama et al. | |
| 6,728,531 | B1 * | 4/2004 | Lee et al. | 455/419 |
| 6,735,435 | B2 * | 5/2004 | Newell et al. | 455/419 |
| 6,816,715 | B1 * | 11/2004 | Mano | 455/161.3 |
| 6,895,238 | B2 * | 5/2005 | Newell et al. | 455/414.2 |
| 6,920,315 | B1 * | 7/2005 | Wilcox et al. | 455/121 |
| 6,941,154 | B1 * | 9/2005 | Ritter | 455/550.1 |
| 6,968,206 | B1 * | 11/2005 | Whitsey-Anderson | 455/556.1 |
| 6,973,304 | B2 * | 12/2005 | Fujise et al. | 455/422.1 |
| 2003/0054775 | A1 | 3/2003 | Eaves et al. | |
| 2003/0100333 | A1 | 5/2003 | Standke et al. | |
| 2003/0216150 | A1 | 11/2003 | Ueda | |
| 2004/0157572 | A1 * | 8/2004 | Ramaswamy | 455/150.1 |
| 2005/0233762 | A1 * | 10/2005 | Shimomura | 455/550.1 |
| 2007/0052595 | A1 * | 3/2007 | Harano | 343/702 |

FOREIGN PATENT DOCUMENTS

| | | | |
|---|---|---|---|
| EP | 1 168 616 | A2 | 1/2002 |
| JP | 60-66140 | U | 5/1985 |
| JP | S62-57414 | U | 4/1987 |
| JP | H03-192902 | A | 8/1991 |
| JP | 6-45958 | A | 2/1994 |
| JP | 8-307297 | A | 11/1996 |
| JP | H09-191210 | A | 7/1997 |
| JP | 9-270836 | A | 10/1997 |
| JP | H10-2000647 | A | 7/1998 |
| JP | 2000-156651 | A | 6/2000 |

(Continued)

*Primary Examiner*—Sonny Trinh
(74) *Attorney, Agent, or Firm*—Sughrue Mion, PLLC

(57) ABSTRACT

A cellular telephone set is capable of receiving a plurality of broadcast waves while efficiently covering wide bands such as FM and TV broadcasts and reducing mutual effects on radio circuits if the cellular telephone set has the additional function of receiving FM and TV broadcasts and the antenna of the cellular telephone set is used to share receipt of FM and TV broadcasts. The cellular telephone set has an antenna, a radio unit selector switch branching a line connected to the antenna into two lines that are connected respectively to a switch and a cellular telephone set radio unit, and a plurality of impedance adjusting circuits connected parallel to the switch and associated with the broadcast waves, respectively. The switch selects one of the impedance adjusting circuits which is associated with the broadcast wave that is being currently received.

4 Claims, 4 Drawing Sheets

FOREIGN PATENT DOCUMENTS

| | | | |
|---|---|---|---|
| JP | 2001-077719 | A | 3/2001 |
| JP | 2001-526483 | A | 12/2001 |
| JP | 2003-078430 | A | 3/2003 |
| JP | 2003-078441 | A | 3/2003 |
| JP | 2003-153111 | A | 5/2003 |

* cited by examiner 200
201
202
203
204
205
206
207
208
209
210
211
S201
S201

300
301
302
303
304
305
307
308
309
310
311
S301

400
401
402
403
404
405
407
408
409
410
411
S401

CELLULAR PHONE CAPABLE OF RECEIVING A PLURALITY OF BROADCAST WAVES

BACKGROUND OF THE INVENTION

1. Field of the Invention

The present invention relates to a cellular telephone set, and more particularly to a cellular telephone set which is capable of receiving a plurality of broadcast waves including TV and FM broadcast waves in UHF and VHF bands.

2. Description of the Related Art

For radio units and receivers that are commercially available today to be compatible with frequencies in the VHF band for FM and TV broadcast waves and with frequencies in the UHF band for TV broadcast waves, the radio units and receivers often use a rod antenna, a helical antenna, or the like because wavelengths in the VHF band for TV broadcast waves are very long. Heretofore, various arrangements, to be described below, available to adjust radio waves that are received by a single antenna, depending on the situation in which the radio waves are used.

Japanese laid-open patent publication No. 2000-156651 discloses a communication terminal having a TDMA radio unit and a CDMA radio unit which share a single antenna, the radio units being selectively switched to use the antenna.

Japanese laid-open patent publication No. 2001-077719 reveals a cellular telephone set having a plurality of impedance adjusting circuits for handling an impedance change caused when the cellular telephone set is close to or contacts a human body, and a switch for selecting one of the impedance adjusting circuits to be used depending on whether there is an audio signal or not.

Japanese laid-open patent publication No. H03-192902 discloses an antenna device having an antenna shared by an automobile radio telephone set and an AM/FM receiver, and an impedance converter circuit for AM broadcasts and a matching circuit for FM broadcasts which are connected between the antenna and the AM/FM receiver.

The VHF and UHF bands for FM and TV broadcasts are very wide, and it is difficult for the antennas of small-size radio units to simultaneously satisfy antenna characteristics for both VHF and UHF bands.

If a cellular telephone set has the additional function of receiving FM and TV broadcasts, then the cell phone's antenna is used to share receipt of both FM and TV broadcast signals. However, it is possible that the shared antenna system may effect the radio circuits which receive both telephone and broadcast signals.

The communication terminal disclosed in Japanese laid-open patent publication No. 2000-156651 simplifies switching between the receiver circuits, but does not addresse the problems described above.

The cellular telephone set disclosed in Japanese laid-open patent publication No. 2001-077719 selects one of the impedance adjusting circuits depending on whether the cellular telephone set is close to or contacts the human body. However, the above problems cannot be solved by the disclosed cellular telephone set.

The antenna device disclosed in Japanese laid-open patent publication No. H03-192902 has an impedance converter circuit for AM broadcasts and a matching circuit for FM broadcasts which are connected between the antenna and the AM/FM receiver. If the disclosed antenna device is applied to a wide band such as a VHF or UHF band for FM and TV broadcasts, then the arrangement of a network for implementing the impedance converter circuit and the matching circuit becomes complex in arrangement, and is difficult to realize.

SUMMARY OF THE INVENTION

It is an object of the present invention to provide a cellular telephone set which is capable of receiving a plurality of broadcast waves while efficiently covering wide bands such as FM and TV broadcasts and of reducing the effects on radio circuits if the cellular telephone set has an additional function of receiving FM and TV broadcasts and the antenna of the cellular telephone set is used to share to receipt of both FM and TV broadcasts signals.

According to the embodiment of the present invention, a cellular telephone set capable of receiving a plurality of broadcast waves includes an antenna for sending and receiving a radio wave in a band used by the cellular telephone set and for receiving a plurality of broadcast waves, a first switch, a cellular telephone set radio unit for performing a cellular telephone function using the antenna, a radio unit selector switch branching a line connected to the antenna into two lines that are connected respectively to the first switch and the cellular telephone set radio unit, a second switch, a plurality of impedance adjusting circuits connected in parallel between the first switch and the second switch and respectively associated with the plurality of broadcast waves, a TV/FM controller for outputting an identification signal representing one of the broadcast waves that is currently being received at the first switch and the second switch, and a TV/FM receiver for demodulating the broadcast wave which is output from the second switch, wherein the first switch and the second switch select one of the impedance adjusting circuits which is associated with the broadcast-wave that is currently being received which is represented by the identification signal.

According to another embodiment of the present invention, a cellular telephone set capable of receiving a plurality of broadcast waves includes an antenna for sending and for receiving a radio wave in a band used by the cellular telephone set and receiving a plurality of broadcast waves, a first switch, a cellular telephone set radio unit for performing a cellular telephone function using the antenna, a frequency distributor connected to the antenna, for separating the radio wave in the band used by the cellular telephone set and the broadcast waves from each other, for supplying the radio wave in the band used by the cellular telephone set to the cellular telephone set radio unit, and for supplying the broadcast waves to the first switch, a second switch, a plurality of impedance adjusting circuits connected in parallel between the first switch and the second switch and associated with the plurality of broadcast waves, respectively, a TV/FM controller for outputting an identification signal representing one of the broadcast waves that is currently being received at the first switch and the second switch, and a TV/FM receiver for demodulating the broadcast wave which is output from the second switch, wherein the first switch and the second switch select one of the impedance adjusting circuits which is associated with the broadcast wave that is currently being received which is represented by the identification signal.

According to still another embodiment of the present invention, a cellular telephone set capable of receiving a plurality of broadcast waves includes an antenna for sending and receiving a radio wave in a band used by the cellular telephone set and receiving a plurality of broadcast waves, a switch, a cellular telephone set radio unit for performing a cellular telephone function using the antenna, a TV/FM receiver for demodulating the broadcast waves which are received by the antenna, a radio unit selector switch branching a line connected to the antenna into two lines that are connected respectively to the switch and the TV/FM receiver, a plurality of impedance adjusting circuits connected in parallel between the switch and ground and associated with the plurality of broadcast waves, respectively, and a TV/FM controller for outputting an identification signal representing one of the broadcast waves that is currently being received at the switch, wherein the switch selects one of the impedance adjusting circuits which is associated with the broadcast wave that is currently being received which is represented by the identification signal.

According to yet another embodiment of the present invention, a cellular telephone set capable of receiving a plurality of broadcast waves includes an antenna for sending and receiving a radio wave in a band used by the cellular telephone set and for receiving a plurality of broadcast waves, a switch, a cellular telephone set radio unit for performing a cellular telephone function using the antenna, a TV/FM receiver for demodulating the broadcast waves which are received by the antenna, a frequency distributor connected to the antenna, for separating the radio wave in the band used by the cellular telephone set and the broadcast waves from each other, supplying the radio wave in the band used by the cellular telephone set to the cellular telephone set radio unit, and for supplying the broadcast waves to the switch and the TV/FM receiver, a plurality of impedance adjusting circuits connected in parallel between the switch and ground and respectively associated with the plurality of broadcast waves, and a TV/FM controller for outputting an identification signal representing one of the broadcast waves that is currently being received at the switch, wherein the switch selects one of the impedance adjusting circuits which is associated with the broadcast wave that is currently being received which is represented by the identification signal.

According to the present invention, the radio wave in the band used by the cellular telephone set is used by the cellular telephone radio set, and the broadcast waves are used by the circuits connected to the switch or switches. The impedance adjusting circuits, which optimize impedances to the UHF band, the VHF-Hch band, the VHF-Lch band, and the FM band, are connected in parallel to the switch or switches. One of the impedance adjusting circuits which is associated with the broadcast wave that is currently being received is selected. Accordingly, broadcast signals can easily be received without changing the antenna characteristics of the cellular telephone set.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
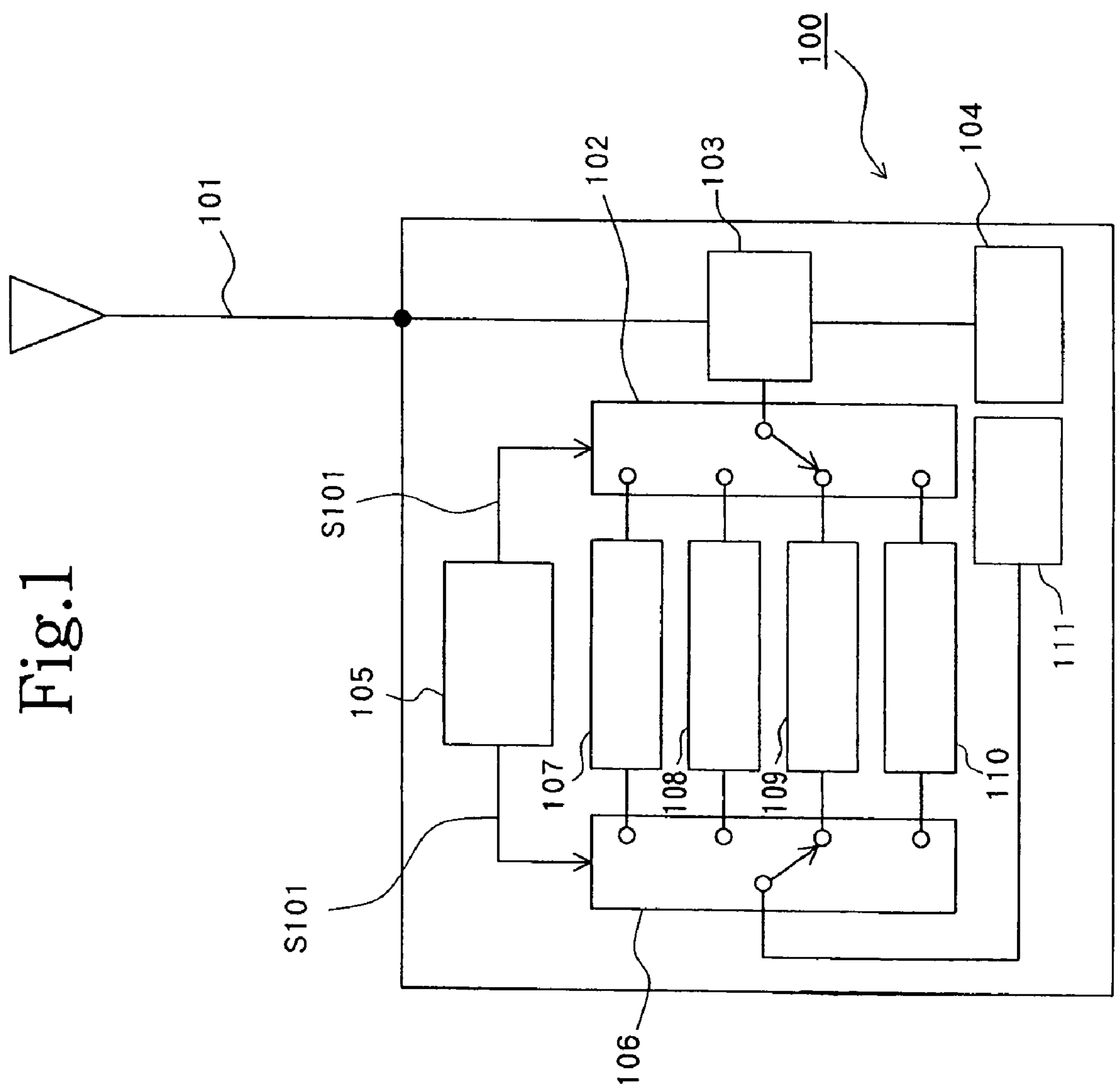
FIG. 1 is a block diagram of a cellular telephone set according to the first embodiment of the present invention.

FIG. 1 shows in clock form a cellular telephone set according to the first embodiment of the present invention.

As shown in FIG. 1, cellular telephone set 100 according to the first embodiment of the present invention has a function of receiving FM broadcasts and TV broadcasts. Cellular telephone set 100 has antenna 101 and a casing which houses therein band selector switch 102, radio unit selector switch 103, cellular telephone set radio unit 104, TV/FM controller 105, band selector switch 106, UHF impedance adjusting circuit 107, VHF-Hch impedance adjusting circuit 108, VHF-Lch impedance adjusting circuit 109, FM impedance adjusting circuit 110, and TV/FM receiver 111.

Cellular telephone set 100 also has, in addition to the above components, a display unit for displaying TV images and information about the cellular telephone, a speaker for outputting sound, an input means for selecting operational modes, and a means for performing a cellular telephone function. These additional units and means will not be illustrated and described in detail below as they are general in nature and can be realized according to known technology. Cellular telephone set 100 according to the first embodiment operates as a cellular telephone set or an FM and TV broadcast receiver depending on the input to the above input means. TV/FM controller 105 is arranged to be able to confirm the current mode of operation of cellular telephone set 100, and performs a control process depending on the current mode of operation of cellular telephone set 100.

Antenna 101 is an antenna for receiving radio waves in the VHF and UHF bands for FM and TV broadcasts and also for receiving and sending radio waves in the band used by cellular telephone set 100. Radio unit selector switch 103 is connected to antenna 101 and branches the line connected to antenna 101 into two lines that are connected respectively to cellular telephone set radio unit 104 and band selector switch 102. When cellular telephone set 100 operates as a cellular telephone set, cellular telephone set radio unit 104 sends and receives a signal through antenna 101.

Band selector switches 102, 106 serve to adjust an impedance depending on the received radio wave when a TV or an FM broadcast is received. UHF impedance adjusting circuit 107, VHF-Hch impedance adjusting circuit 108, VHF-Lch impedance adjusting circuit 109, and FM impedance adjusting circuit 110 are connected in parallel between band selector switches 102, 106. When cellular telephone set 100 is receives an FM and a TV broadcast, TV/FM controller 105 outputs identification signal S101 representing the broadcast wave that is being received to band selector switches 102, 106.

Band selector switches 102, 106 select an impedance adjusting circuit which is associated with the broadcast wave that is being received. For example, if identification signal S101 represents the reception of a UHF broadcast, then band selector switches 102, 106 select UHF impedance adjusting circuit 107. If identification signal S101 represents the reception of a VHF-Hch broadcast, then band selector switches 102, 106 select VHF-Hch impedance adjusting circuit 108. If identification signal S101 represents the reception of a VHF-Lch broadcast, then band selector switches 102, 106 select VHF-Lch impedance adjusting circuit 109. If identification signal S101 represents the reception of an FM broadcast, then band selector switches 102, 106 select FM impedance adjusting circuit 110.

TV/FM receiver 111 demodulates the broadcast wave that has been adjusted by the selected impedance adjusting circuit.

A radio terminal device which incorporates a plurality of radio units housed in one casing may have a plurality of antennas. According to another approach which is often employed, such a radio terminal device has an antenna compatible with multiple bands. The multiband antenna receives radio waves in plural frequencies through dual-resonance elements or wider-band designs. If a small-size radio terminal device has an additional function of receiving FM and TV broadcasts in addition to its radio communication capability, then since FM, VHF, and UHF bands have a high frequency range from about 70 to 800 MHz, and are very wide, it is difficult to realize an antenna device capable of simultaneously handling signals in those bands for use with such a small-size radio terminal device.

If a multiband antenna is used, then it is difficult for one matching circuit to achieve sufficient antenna characteristics for such a multiband antenna in all bands. One solution to the problem is to switch between a plurality of antenna matching circuits depending on the required frequency band.

If the antenna matching circuits are combined with a switching circuit and a circuit is added for selecting matching constants depending on frequency bands, then since switching can be performed between the antenna matching circuits, adjustments can easily be made to obtain the required frequency band.

However, if a device comprising a combination of a cellular telephone set and a receiver has additional antenna matching circuits that are selected, depending on broadcast waves, to switch between received frequency bands, then it is possible that the additional antenna matching circuits will affect the impedance of the cellular telephone set. When the cellular telephone set and the receiver, which receives FM and TV broadcasts, are simultaneously operated, the antenna characteristics of the cellular telephone set may be changed by a broadcast that is being received.

According to the present embodiment, radio unit selector switch 103 is provided for separately connecting antenna 101 in branches to cellular telephone set radio unit 104 and band selector switch 102, and the impedance adjusting circuits are provided for optimizing impedances to the UHF band, the VHF-Hch band, the VHF-Lch band, and the FM band are connected parallel to one of the branches, and impedance adjusting circuits selected one at a time by band selector switches 102, 106. Accordingly, broadcast signals can be easily received without changing the antenna characteristics of the cellular telephone set.

Figure 2:
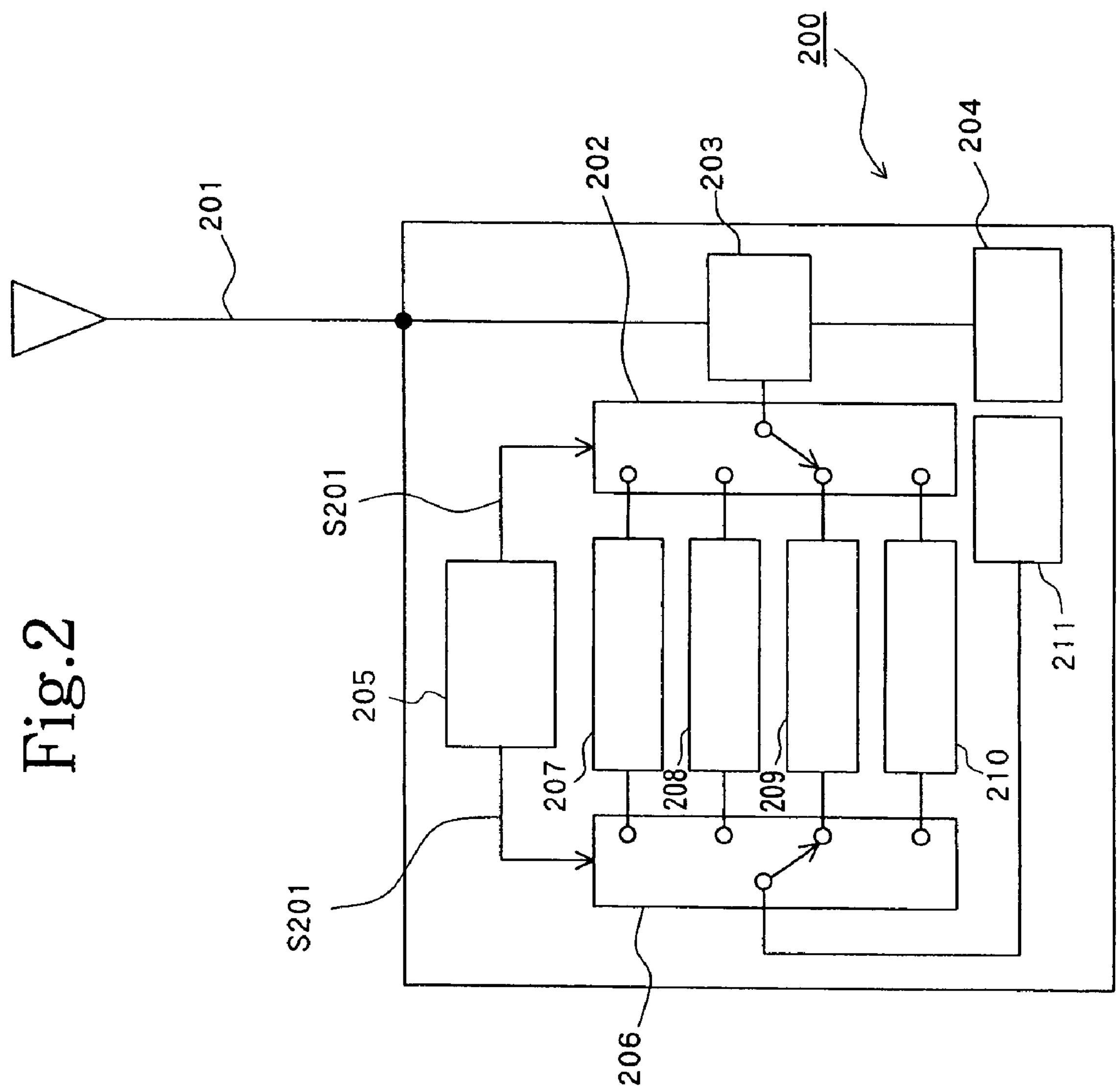
FIG. 2 is a block diagram of a cellular telephone set according to the second embodiment of the present invention.

A cellular telephone set according to the second embodiment of the present invention will be described below with reference to FIG. 2.

Cellular telephone set 200 according to the second embodiment has antenna 201, band selector switch 202, cellular telephone set radio unit 204, TV/FM controller 205, band selector switch 206, UHF impedance adjusting circuit 207, VHF-Hch impedance adjusting circuit 208, VHF-Lch impedance adjusting circuit 209, FM impedance adjusting circuit 210, and TV/FM receiver 211. These components of cellular telephone set 200 are identical to antenna 101, band selector switch 102, cellular telephone set radio unit 104, TV/FM controller 105, band selector switch 106, UHF impedance adjusting circuit 107, VHF-Hch impedance adjusting circuit 108, VHF-Lch impedance adjusting circuit 109, FM impedance adjusting circuit 110, and TV/FM receiver 111 which are shown in FIG. 1, and will not be described in detail below.

In the second embodiment, radio unit selector switch 103 according to the first embodiment is replaced with frequency distributor 203. Frequency distributor 203 serves to separate high frequencies used for the cellular telephone function by cellular telephone set radio unit 204, e.g., 1.9 to 2.1 GHz used for W-CDMA, and frequencies, e.g., 70 to 800 MHz used by TV/FM receiver 211, from each other.

By thus separating the frequencies, cellular telephone set radio unit 204 and TV/FM receiver 211 are isolated from each other in order to reduce effects that those frequencies have on both cellular telephone set radio unit 204 and TV/FM receiver 211. Since signals received by antenna 210 can simultaneously be sent to cellular telephone set radio unit 204 and TV/FM receiver 211, cellular telephone set 200 is capable of simultaneously receiving cellular telephone, TV and FM broadcast signals.

According to the second embodiment, it is important to use a device such as frequency distributor **203*b* that is capable of sufficiently isolating the cellular telephone set radio unit and the TV/FM receiver from each other, as frequency distributor 203**. Using such a device makes it possible to reduce adverse effects that reception band switching has on the cellular telephone set radio unit.

Figure 3:
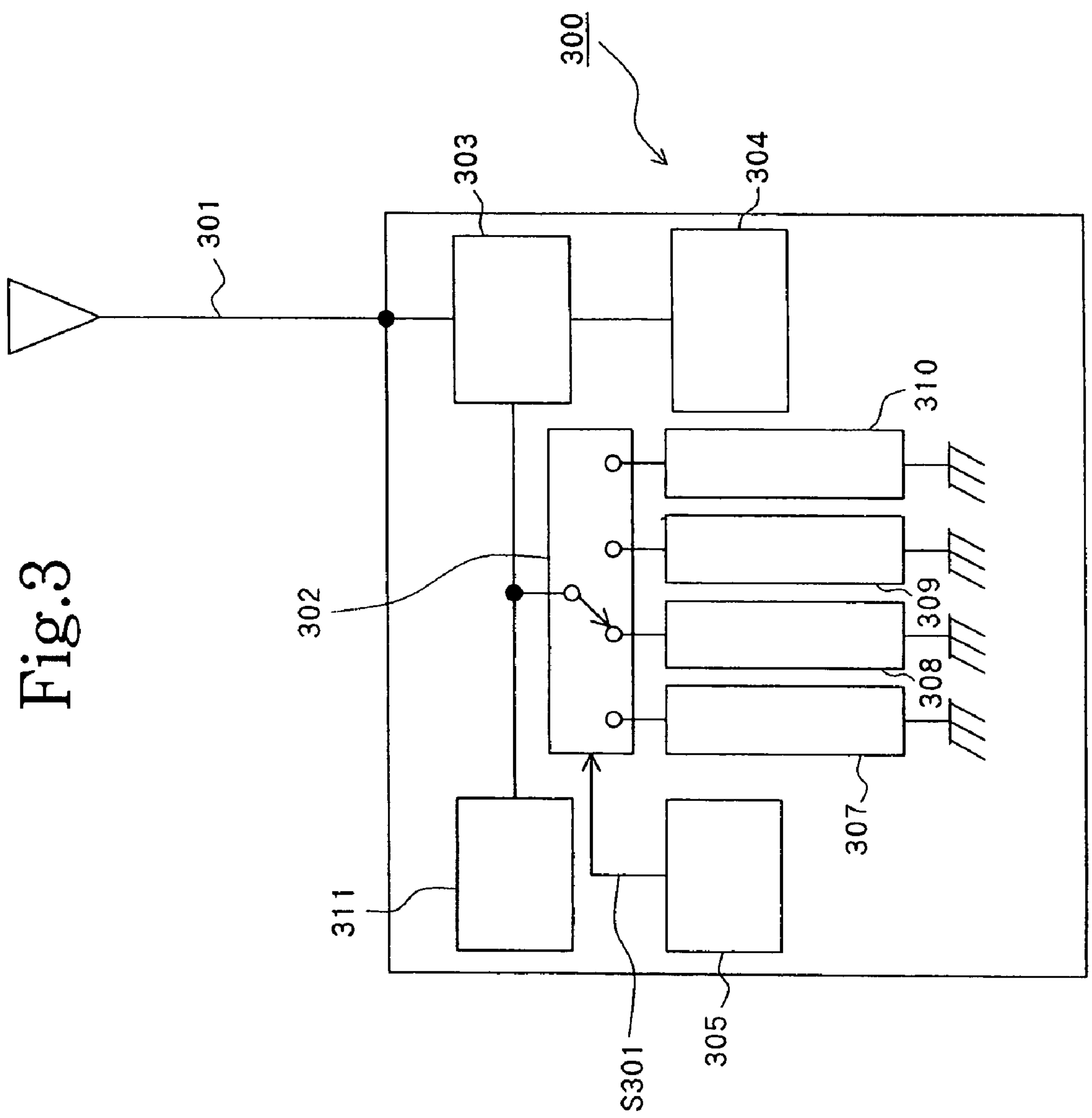
FIG. 3 is a block diagram of a cellular telephone set according to the third embodiment of the present invention.

A cellular telephone set according to the third embodiment of the present invention will be described below with reference to FIG. 3.

Cellular telephone set 300 according to the third embodiment has a function of receiving FM and TV broadcasts. Cellular telephone set 300 has antenna 301 and a casing which houses therein band selector switch 302, radio unit selector switch 303, cellular telephone set radio unit 304, TV/FM controller 305, UHF impedance adjusting circuit 307, VHF-Hch impedance adjusting circuit 308, VHF-Lch impedance adjusting circuit 309, FM impedance adjusting circuit 310, and TV/FM receiver 311.

Cellular telephone set 300 also has, in addition to the above components, a display unit for displaying TV images and information about the cellular telephone, a speaker for outputting sound, an input means for selecting operational modes, and a means for performing a cellular telephone function. These additional units and means will not be illustrated and described in detail below as they are general in nature and can be realized according to the known technology. Cellular telephone set 300 according to the third embodiment operates as a cellular telephone set or a FM and TV broadcast receiver depending on the input to the above input means. TV/FM controller 305 is arranged so that it can confirm the present mode of operation of cellular telephone set 300, and performs a control process depending on the present mode of operation of cellular telephone set 300.

Antenna 301 is an antenna for receiving radio waves in the VHF and UHF bands for FM and TV broadcasts and also for receiving and sending radio waves in the band used by cellular telephone set 300. Radio unit selector switch 303 is connected to antenna 301 and branches the line connected to antenna 301 into two lines that are connected respectively to cellular telephone set radio unit 304, and TV/FM receiver 311 and band selector switch 302. When cellular telephone set 300 operates as a cellular telephone set, cellular telephone set radio unit 304 sends and receives a signal through antenna 301.

Band selector switch 302 serves to adjust impedance depending on the received radio wave when a TV broadcast or an FM broadcast is received. UHF impedance adjusting circuit 307, VHF-Hch impedance adjusting circuit 308, VHF-Lch impedance adjusting circuit 309, and FM impedance adjusting circuit 310 are connected in parallel between band selector switch 302 and the ground. When cellular telephone set 300 is receives an FM and a TV broadcast, TV/FM controller 305 outputs identification signal S301 representing the broadcast wave that is being received to band selector switch 302.

Band selector switch 302 selects an impedance adjusting circuit which is associated with the broadcast wave that is being received. For example, if identification signal S301 represents the reception of a UHF broadcast, then band selector switch 302 selects UHF impedance adjusting circuit 307. If identification signal S301 represents the reception of a VHF-Hch broadcast, then band selector switch 302 selects VHF-Hch impedance adjusting circuit 308. If identification signal S301 represents the reception of a VHF-Lch broadcast, then band selector switch 302 selects VHF-Lch impedance adjusting circuit 309. If identification signal S301 represents the reception of an FM broadcast, then band selector switch 302 selects FM impedance adjusting circuit 310.

TV/FM receiver 311 demodulates the broadcast wave that has been adjusted by the selected impedance adjusting circuit.

According to the present embodiment, the impedance adjusting circuits, which are connected between the two switches in the first and second embodiments, are connected parallel between one of the switches and the ground.

According to the present embodiment, since the impedance adjusting circuits are not inserted between radio unit selector switch 303 and TV/FM receiver 311, any loss of received radio waves due to a circuit loss caused by the impedance adjusting circuits is minimized.

Figure 4:
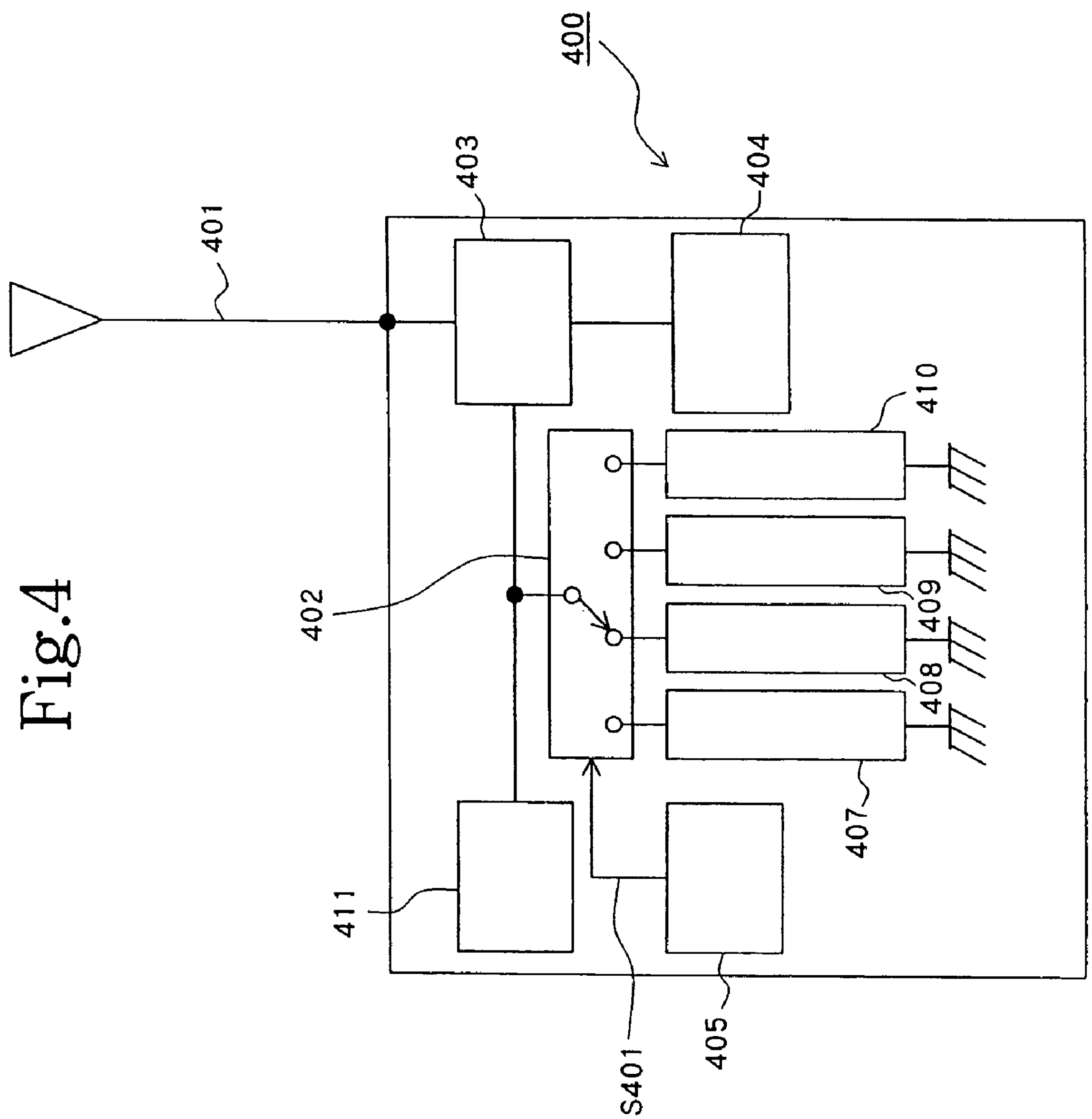
FIG. 4 is a block diagram of a cellular telephone set according to the fourth embodiment of the present invention.

A cellular telephone set according to a fourth embodiment of the present invention will be described below with reference to FIG. 4.

Cellular telephone set 400 according to the fourth embodiment has antenna 401, band selector switch 402, cellular telephone set radio unit 404, TV/FM controller 405, UHF impedance adjusting circuit 407, VHF-Hch impedance adjusting circuit 408, VHF-Lch impedance adjusting circuit 409, FM impedance adjusting circuit 410, and TV/FM receiver 411. These components of cellular telephone set 400 are identical to antenna 301, band selector switch 302, cellular telephone set radio unit 304, TV/FM controller 305, UHF impedance adjusting circuit 307, VHF-Hch impedance adjusting circuit 308, VHF-Lch impedance adjusting circuit 309, FM impedance adjusting circuit 310, and TV/FM receiver 311 which are shown in FIG. 3, and will not be described in detail below.

In the fourth embodiment, radio unit selector switch 303 according to the third embodiment is replaced with frequency distributor 403. Frequency distributor 403 serves to separate high frequencies used for the cellular telephone function by cellular telephone set radio unit 404, e.g., 1.9 to 2.1 GHz used for W-CDMA, and frequencies, e.g., 70 to 800 MHz used by TV/FM receiver 411, from each other.

By thus separating the frequencies, cellular telephone set radio unit 404 and TV/FM receiver 411 are isolated from each other in order to reduce effects that those frequencies have on both cellular telephone set radio unit 404 and TV/FM receiver 411. Since signals received by antenna 410 can simultaneously be sent to cellular telephone set radio unit 404 and TV/FM receiver 411, cellular telephone set 400 is capable of simultaneously receiving cellular telephone signals and TV and FM broadcast signals.

According to the fourth embodiment, it is important to use a device such as frequency distributor 403 that is capable of sufficiently isolating the cellular telephone set radio unit and the TV/FM receiver from each other. Using such a device makes it possible to reduce adverse effects that reception band switching has on the cellular telephone set radio unit.

While preferred embodiments of the present invention have been described using specific terms, such description is for illustrative purposes only, and it is to be understood that changes and variations may be made without departing from the spirit or scope of the following claims.

What is claimed is:

1. A cellular telephone set capable of receiving a plurality of broadcast waves, comprising:

an antenna for sending and receiving a radio wave in a band used by the cellular telephone set and receiving a plurality of broadcast waves;

a first switch;

a cellular telephone set radio unit for performing a cellular telephone function using said antenna;

a radio unit selector switch branching a line connected to said antenna into two lines that are connected respectively to said first switch and said cellular telephone set radio unit;

a second switch;

a plurality of impedance adjusting circuits connected in parallel between said first switch and said second switch and associated with said plurality of broadcast waves, respectively;

a TV/FM controller for outputting an identification signal representing one of the broadcast waves, that is being currently received to said first switch and said second switch; and a TV/FM receiver for demodulating the broadcast wave which is output from said second switch;

wherein said first switch and said second switch select one of said impedance adjusting circuits which is associated with the broadcast wave that is being currently received and which is represented by said identification signal.

2. A cellular telephone set capable of receiving a plurality of broadcast waves, comprising:

an antenna for sending and receiving a radio wave in a band used by the cellular telephone set and receiving a plurality of broadcast waves;

a first switch;

a cellular telephone set radio unit for performing a cellular telephone function using said antenna;

a frequency distributor connected to said antenna, for separating the radio wave in the band used by the cellular telephone set and the broadcast waves from each other, supplying the radio wave in the band used by the cellular telephone set to said cellular telephone set radio unit, and supplying the broadcast waves to said first switch;

a second switch;

a plurality of impedance adjusting circuits connected in parallel between said first switch and said second switch and associated with said plurality of broadcast waves, respectively;

a TV/FM controller for outputting an identification signal representing one of the broadcast waves that is being currently received, to said first switch and said second switch; and a TV/FM receiver for demodulating the broadcast wave which is output from said second switch;

wherein said first switch and said second switch select one of said impedance adjusting circuits which is associated with the broadcast wave that is being currently received and which is represented by said identification signal.

3. A cellular telephone set capable of receiving a plurality of broadcast waves, comprising:

an antenna for sending and receiving a radio wave in a band used by the cellular telephone set and receiving a plurality of broadcast waves;

a switch;

a cellular telephone set radio unit for performing a cellular telephone function using said antenna;

a TV/FM receiver for demodulating the broadcast waves which are received by said antenna;

a radio unit selector switch branching a line connected to said antenna into two lines that are connected respectively to said switch and said TV/FM receiver;

a plurality of impedance adjusting circuits connected in parallel between said switch and ground and associated with said plurality of broadcast waves, respectively; and a TV/FM controller for outputting an identification signal representing one of the broadcast waves, that is being currently received to said switch;

wherein said switch selects one of said impedance adjusting circuits which is associated with the broadcast wave that is being currently received and which is represented by said identification signal.

4. A cellular telephone set capable of receiving a plurality of broadcast waves, comprising:

an antenna for sending and receiving a radio wave in a band used by the cellular telephone set and receiving a plurality of broadcast waves;

a switch;

a cellular telephone set radio unit for performing a cellular telephone function using said antenna;

a TV/FM receiver for demodulating the broadcast waves which are received by said antenna;

a frequency distributor connected to said antenna, for separating the radio wave in the band used by the cellular telephone set and the broadcast waves from each other, supplying the radio wave in the band used by the cellular telephone set to said cellular telephone set radio unit, and supplying the broadcast waves to said switch and said TV/FM receiver;

a plurality of impedance adjusting circuits connected in parallel between said switch and ground and associated with said plurality of broadcast waves, respectively; and a TV/FM controller for outputting an identification signal representing one of the broadcast waves, that is being currently received to said switch;

wherein said switch selects one of said impedance adjusting circuits which is associated with the broadcast wave that is being currently received and which is represented by said identification signal.

* * * * *